April 12, 1949. W. R. TUTTLE 2,467,348
ELECTRIC HEATER
Filed Sept. 3, 1942 2 Sheets-Sheet 1
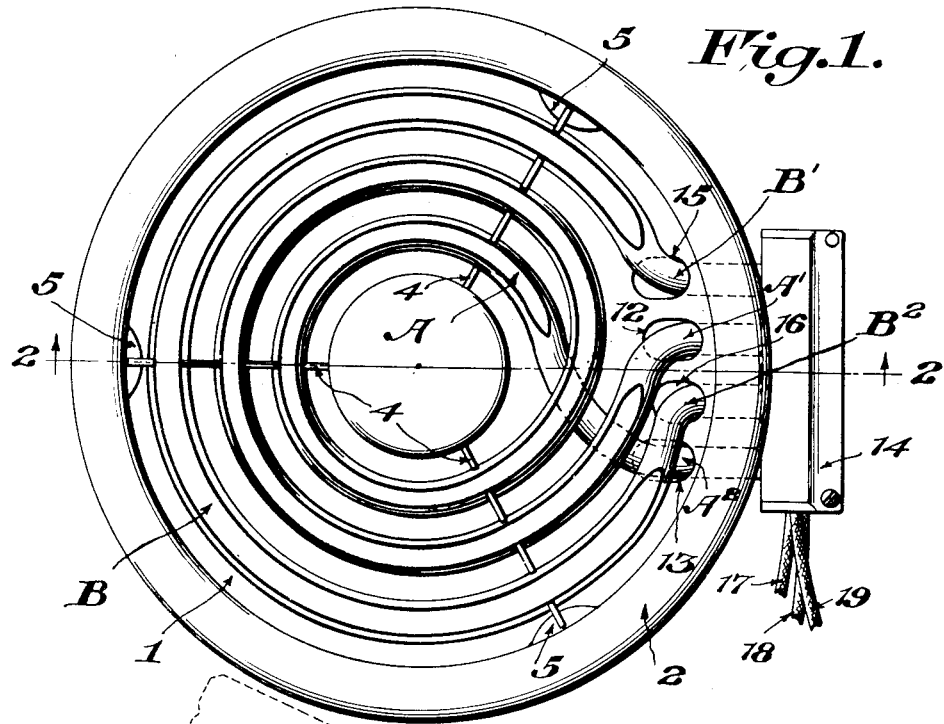
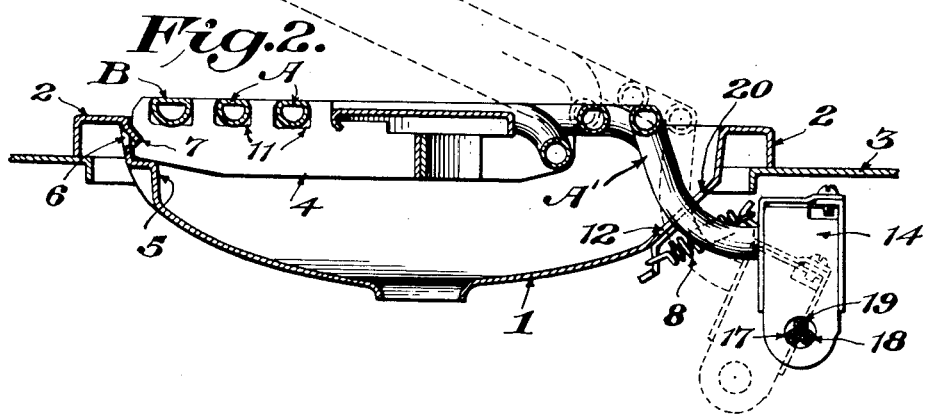
INVENTOR
William R. Tuttle,
BY Eugene M. Giles
ATTORNEY.

April 12, 1949. W. R. TUTTLE 2,467,348
ELECTRIC HEATER
Filed Sept. 3, 1942 2 Sheets-Sheet 2
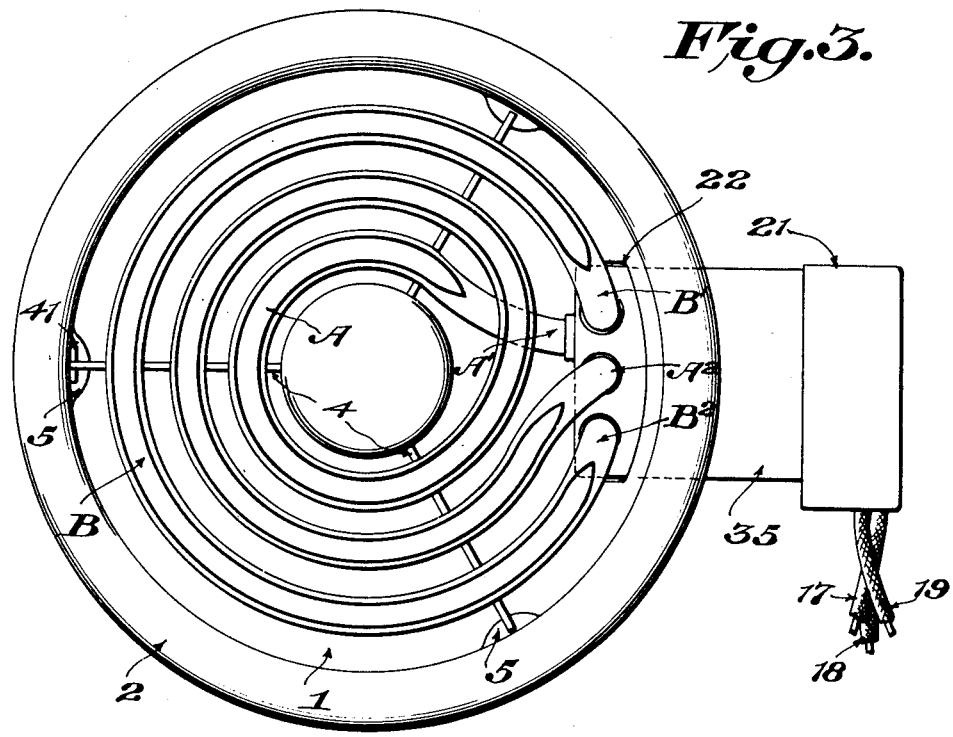
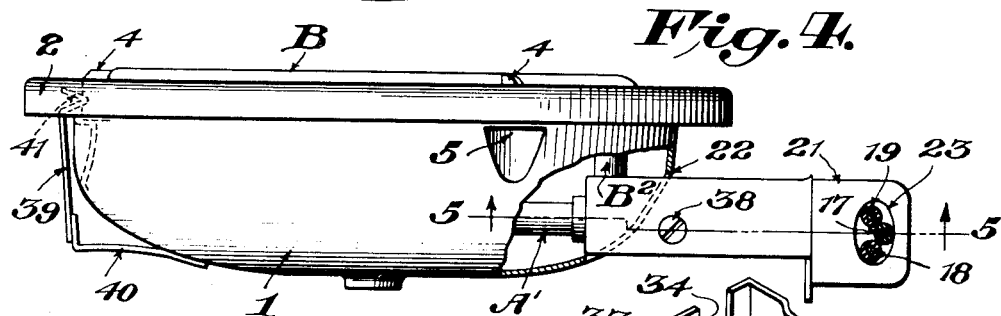
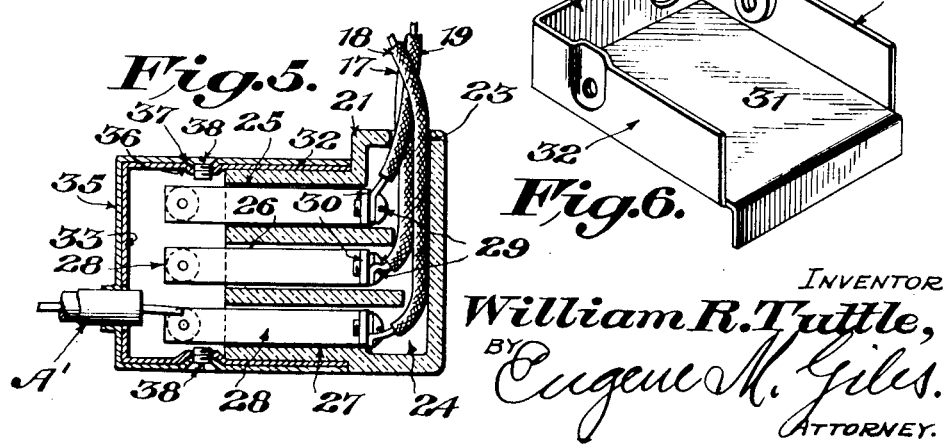
INVENTOR
William R. Tuttle,
BY Eugene M. Giles.
ATTORNEY.

Patented Apr. 12, 1949

2,467,348

UNITED STATES PATENT OFFICE 2,467,348

ELECTRIC HEATER

William R. Tuttle, Riverside, Ill., assignor to Tuttle & Kift, Inc., Chicago, Ill., a corporation of Illinois Application September 3, 1942, Serial No. 457,180

1 Claim. (Cl. 219—37)

This invention relates to electrical heating units such as are used in electric ranges or the like for cooking purposes and which commonly include a reflector pan supported within an opening in a range top, and an electric heating element supported across the open top of the pan. It will be apparent, in such an arrangement, that the heating element obstructs access through the open top of the pan into the interior thereof, and therefore, interferes with, if not actually prevents, the cleaning of the interior of the pan and the underside of the heating element when such parts become soiled by the accumulation of food spilled upon the heating element.

According to the present invention, it is proposed to afford convenient access to the interior of the reflector pan and to the underside of the heating element for removing therefrom any objectionable accumulations of spilled food, and in this connection it is proposed to provide for a mounting of the heating element over the reflector pan in such a manner that the heating element may be tilted upwardly until the heating element has been moved into a position where the open top of the pan is not obstructed by the heating element. In such position of the heating element access may be conveniently had to the interior of the pan and the underside of the heating element for any desired purpose.

It is a further object of the invention to avoid, in the tilting of the heating element, any bending strains on the conductors which are connected to the heating element, and which eventually are likely to become broken by the tilting if subjected to repeated bending.

With these and other objects in view, the present invention consists in the combination and arrangement of parts as will hereinafter be more fully described, illustrated in the accompanying drawings, and particularly pointed out in the appended claims, it being understood that changes in the form, proportion, size and minor details may be made, within the scope of the claim without departing from the spirit or sacrificing any of the advantages of the invention.

In the drawings:

Fig. 1 is a top plan view of an electric heating unit assembly embodying the features of the present invention.

Fig. 2 is a vertical sectional view on the line 2—2 of Fig. 1, with the heating element shown in dotted lines tilted upwardly part way.

Fig. 3 is a top plan view of an electric heating unit hot-plate or the like embodying another form of the present invention.

Fig. 4 is a side elevation of Fig. 3, parts of the reflector pan being broken away to show the connection between or assembly of a part of the electric heating element with the reflector pan.

Fig. 5 is an inverted plan section on the line 5—5 of Fig. 4.

Fig. 6 is a perspective view of a detail.

Referring at first more particularly to Figs. 1 and 2 of the drawings, it will be seen that the electric heating unit of the present invention includes a support member in the form of a more or less shallow pan 1, having an open top, and provided at its top edge with an outwardly and downwardly directed marginal flange 2, intended to rest upon a stove top 3, adjacent the periphery of a so-called burner opening therein, which is a convenient manner of mounting the supporting member upon a stove top so that the pan 1, is positioned within the burner opening.

Within the open top of the pan or supporting member 1, is a grid or spider 4, shown in Fig. 1 as embodying three radial arms, but it will, of course, be understood that the number of arms is not essential and may be varied according to the requirements of any particular form of heating element. This grid may be supported in any suitable manner within the pan 1. As shown in the accompanying drawing, the outer end of each grid arm 4 rests upon a shoulder 5 provided upon the inner face of the upstanding side wall of the reflector pan and may be formed in any suitable manner. As indicated in Figs. 1 and 2, it will be seen that the shoulder 5 is formed by punching a portion of the side wall of the pan inwardly so that the top of the punched portion may form a supporting ledge or shoulder for the outer end of the adjacent grid arm 4.

Suitable means may be provided for holding the grid in place within the pan 1, such, for instance, as has been shown in Fig. 2 of the drawing, wherein 6 designates a tongue or latch member struck or bent from the upright side wall of the pan and extending into engagement with the outer end of the adjacent grid arm 4, the latter preferably being provided with a notch or seat 7 to receive the latch member 6.

The electric heating element shown in connection with the present embodiment of the invention, includes an inner looped electric heating member A, in the form of a continuous tubular coil, preferably flattened on its upper surface, as best shown in Fig. 2, and which rests upon and is supported by the top of the grip support 4. Preferably the convolutions of the coil rest in seats or notches 11, in the top edges of the grid bars 4, and the edges of the notches are slightly crimped around the coil to hold the same firmly seated upon the grid. Other assembly of the grid 4, and the coiled heating member may be employed however. The top surface of the heating member A should, of course, be disposed slightly above the top of the reflector pan 1 so that a cooking vessel may be supported directly upon the heating coil. It, of course, will be understood that the heating element is preferably in the form of a helical resistance element or wire embedded in suitable insulating material, not shown, the whole being encased in the metallic sheathing A.

The specific heating element shown in Fig. 1 also includes an outer heating coil B set in notches in the grid 4, with its top surface flattened and in the same plane of the flattened surface of the member A.

For mounting upon or associating the heating element with the reflector pan A, so that the heating element may be tilted into the dotted position shown in Fig. 2, the opposite terminals $A'$ and $A^2$ of the member A are extended and disposed in substantial parallelism and directed downwardly and outwardly through the respective openings 12 and 13 provided in the upwardly directed side wall of the pan 1, the outer ends of the terminal parts $A'$ and $A^2$ being associated with a connector member 14 of suitable insulating material and disposed below the flange 2 of the pan and the stove top 3. The opposite terminals $B'$ and $B^2$, of the heating member B, are extended downwardly and outwardly through the respective openings 15 and 16 in the adjacent side wall of the reflector pan and are suitably associated with the connector member 14. Suitable flexible conductor leads 17, 18 and 19 extend through one end of the connector member 14 into the interior thereof where they are connected with the terminals of the electric heater members A and B in any suitable manner not shown as the manner of connecting these parts within the connector 14 constitutes no part of the present invention. These conductors 17, 18 and 19 lead into the connector 14 in a direction substantially parallel with the axis of rotation on which the heater members A and B may be tilted, as best indicated in Fig. 2 of the drawings, so that there is no bending of the conductors in the tilting operation which would be likely to break the conductors eventually, but merely a slight twisting of the conductors which they are capable of accommodating without strain or likelihood of eventual breakage.

While separate openings have been shown through the side wall of the pan 1 to accommodate the terminals $A'$, $A^2$, $B'$ and $B^2$, it will, of course, be understood that a single opening or slot may be employed without requiring any change in the assembly to permit tilting of the heating element upon its assembly or association with the pan due to the extending of the heater element terminals through an opening or openings in the side wall of the pan.

The several terminals of the electric heater element are detachably associated with the connector member 14 in order that the heater element and the reflector pan may be assembled by thrusting the terminal members downwardly through the opening or openings in the pan and thereafter associated with the connector 14.

The heating unit of the present invention may be assembled with a stove top 3 by first positioning the unit in an upright position with respect to the opening in the stove top 3 so that the connector 14 may be moved downwardly through the opening in the stove top and then the heating unit turned downwardly into a horizontal position within the stove top opening and with the supporting flange 2 resting upon the upper side of the stove top, in which position the connector 14 will lie beneath the stove top 3 in the position shown in Fig. 2 of the drawings.

By referring to Fig. 2 of the drawings it will be understood that, in the normal operative position of the heater element it is supported by the grid 4 which is in turn supported on the shoulders 5 provided within the upper portion of the reflector pan 1, and the grid is held by the spring latch 6. Preferably the spring latch is located diametrically opposite the terminal members $A'$, $A^2$, $B'$ and $B^2$, and the top edge of the opening or openings 20 in the reflector pan closely overlie the tops of said heater terminals so as to prevent or limit upward movement of the terminals in said opening or openings.

The notched portion 7 of the grid is yieldably held in engagement with the spring latch 6 by means of a helical spring 8 having its upper rear end connected to the front wall of the connector member 14 and its lower forward end connected to the bottom of the pan 1, the spring 8 being under tension in the normal position of the burner, whereby the electric heating member A and the grid 4 associated therewith are urged forwardly or to the left as viewed in Fig. 2 so as to hold the notch end 7 of the grid bar 4 in yieldable and detachable engagement with the spring latch 6. When the heater member A is swung downwardly from the dotted position, shown in Fig. 2, to the full line position thereof, the spring latch 6 snaps into the notch 7 and the spring 8 is placed under tension. Preparatory to upwardly tilting the burner element, it is moved slightly to the right so as to disengage the notch 7 from the spring latch 6 whereupon the burner element is free to be tilted into the dotted line position.

In Figs. 3 and 4 of the drawings there has been shown a modification in the manner of assembling the heater element with the reflector pan, and this modification involves the employment of an insulated connector 21, which extends loosely through an opening 22 in the side wall of the reflector pan, and has the terminals $A'$, $A^2$, $B'$ and $B^2$ connected to the inner end of the connector and within the pan. The connector 21 extends a suitable distance outside of the pan, and the flexible electric leads 17, 18 and 19 are associated with the connector 21 in the same relation to the heating element as in Fig. 1.

In the arrangement shown in Figs. 3 and 4, the heating element may be tilted upon the reflector pan as a support, because the connector 21 fits loosely enough within the opening 22 to permit the necessary tilting of the part 21 within the opening 22.

As shown in Fig. 5, it will be seen that the flexible conductor members extend inwardly through an opening 23 in one side of the connector 21 and into a chamber 24 therein. From this chamber passages 25, 26 and 27 lead to and through the forward end of the connector, and in each of these passages there is a metal strip 28 to the rear end of which one of the flexible conductors is connected in any suitable manner, as by means of a headed screw 29 engaging a screw threaded opening in a shoulder 30 on a conductor strip 28. The connector 21 is received within a housing consisting of a bottom member 31, in the form of a rectangular pan having upstanding side walls 32 and an end wall 33, the latter having a notch 34 to receive one of the terminals of the electric heater element, as best shown in Fig. 5 of the drawings. The several terminals of the heater element are electrically connected with respective conductor strips 28 at their forward ends in any suitable manner as will be readily understood. A cover member 35 embraces and telescopes with the bottom member 31, and adjacent side walls of these members are provided with inwardly directed and nested indentations or deformations 36 and 37, each pair of nested portions being held together by a screw 38 passing through the nested portions and having its head countersunk in the outer wall of the cover member 35.

While any suitable means may be employed for holding the grid in place within the open top of the pan, there has been shown in Fig. 4 of the drawing a spring latch member 39 consisting of an upstanding arm having a lateral extension 40 at its lower end suitably secured to the bottom or the side of the pan 1, the upper free end of the spring arm 39 being provided with a suitable latch head 41, shown in the drawing as substantially V-shaped, said latch head extending through an opening in the side wall of the pan and engaging the end of the adjacent grid arm 5 in about the same manner as illustrated for the spring latch member 6 in Fig. 2 of the drawings.

The difference between the construction shown in Figs. 1 and 2 and that shown in Figs. 3 and 4 is that in Figs. 1 and 2 it is the terminals of the electric heating members which extend through the side wall of the reflector pan and constitute the hinge element on which the heating unit may be tilted, whereas in Figs. 3 and 4 it is the connector member 21 which constitutes the hinge member for tilting movement in the opening in the side wall of the reflector pan. It will now be understood that, in each form of the invention, there is a heater part (the terminals A', A², B' and B² in Figs. 1 and 2, and the connector member 21 in Figs. 3 and 4) which constitutes the hinge element of the invention, which part extends through an opening in the side wall of the reflector pan and is the part on which the electric heating element may be tilted from and to its operative position.

In other words, in the embodiment shown in Figs. 1 and 2 it is the bare terminals A', A², B' and B² that extend loosely through the side wall of the reflector pan. While in Figs. 3 and 4, the said terminals extend into and are housed within the insulator connector 21 forming a part of the electric heating unit, and it is the connector which extends loosely through the side wall of the reflector pan. In each form of the invention it is a part of the electric heating unit which extends loosely through the side wall of the pan and constitutes the hinge member for tiltably mounting the electric heating unit upon the pan. In each instance the insulator connector member is at the exterior of the pan and below the marginal top flange 2, whereby it will be below the stove top 3 and will not in any manner interfere with the placing of cooking utensils upon the top of the heating unit.

While I have described my invention in a preferred form, I am aware that various changes and modifications may be made without departing from the principles of my invention, the scope of which is to be determined by the appended claim.

What is claimed is:

In a heating unit assembly of the class described, the combination of a heater mounting comprising an open top pan formed with an upwardly extending side wall therearound having an outturned flange at the top by which the pan is supported, and a flat heater supported on said side wall within the top of the pan, said flat heater having a rigid extension thereunder which projects outwardly therebeyond and said pan side wall having an opening therethrough through which said rigid extension projects, said extension being loosely confined between the upper and lower margins of said opening to provide a loosely hinged connection of the flat heater with the heater mounting whereby the flat heater is tiltable to an upraised position, said flat heater comprising a coiled tube and a supporting spider with radial arms to the tops of which the coiled tube is secured, and said side wall having at the inner side peripherally spaced shoulders on which the outer ends of said radial arms rest to support the heater within the top of the pan, and a releasable latch on said mounting at one side thereof and engageable with the outer end of one of said radial arms to retain the heater on said shoulders, and spring means at the opposite side of said mounting for yieldingly holding said outer end engaged with said latch.

WILLIAM R. TUTTLE.

REFERENCES CITED

The following references are of record in the file of this patent:

UNITED STATES PATENTS

| Number | Name | Date |
| --- | --- | --- |
| Re. 22,177 | Sharp | Sept. 8, 1942 |
| 1,680,402 | Vaughan | Aug. 14, 1928 |
| 1,708,258 | Cannon | Apr. 9, 1929 |
| 1,749,173 | Wells | Mar. 4, 1930 |
| 1,998,330 | Nicholson et al. | Apr. 16, 1935 |
| 2,028,604 | Hermanni | Jan. 21, 1936 |
| 2,262,507 | Lightfoot | Nov. 11, 1941 |
| 2,320,041 | McCormick | May 25, 1943 |